US009303979B2

(12) United States Patent  
Holzapfel

(10) Patent No.: US 9,303,979 B2  
(45) Date of Patent: Apr. 5, 2016

(54) OPTICAL POSITION MEASURING DEVICE

(71) Applicant: DR. JOHANNES HEIDENHAIN GMBH, Traunreut (DE)

(72) Inventor: Wolfgang Holzapfel, Obing (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 0 days.

(21) Appl. No.: 14/483,257

(22) Filed: Sep. 11, 2014

(65) Prior Publication Data

US 2015/0070711 A1    Mar. 12, 2015

(30) Foreign Application Priority Data

Sep. 11, 2013   (DE) .......................... 10 2013 014 914  
May 13, 2014   (DE) .......................... 10 2014 208 988

(51) Int. Cl.
*G01B 11/14*        (2006.01)
*G01D 5/38*         (2006.01)

(52) U.S. Cl.
CPC . *G01B 11/14* (2013.01); *G01D 5/38* (2013.01)

(58) Field of Classification Search
None
See application file for complete search history.

(56) References Cited

U.S. PATENT DOCUMENTS

| 7,710,578 | B2 | 5/2010 | Sändig et al. |
| 7,907,286 | B2 | 3/2011 | Holzapfel |
| 2008/0094594 | A1 | 4/2008 | Shibazaki |
| 2011/0164238 | A1 | 7/2011 | Yoshimoto |
| 2013/0057872 | A1 | 3/2013 | Holzapfel |

FOREIGN PATENT DOCUMENTS

| DE | 10 2007 023 300 | 11/2008 |
| EP | 1 901 041 | 3/2008 |
| EP | 2 068 112 | 6/2009 |
| EP | 2 565 578 | 3/2013 |
| WO | 2011/068254 | 6/2011 |

OTHER PUBLICATIONS

European Search Report, dated Mar. 13, 2015, issued in corresponding European Patent Application No. 14 18 2781.

*Primary Examiner* — Tri T Ton
(74) *Attorney, Agent, or Firm* — Kenyon & Kenyon LLP

(57) ABSTRACT

In an optical position measuring device for detecting the relative position of a measuring standard and at least one scanning head, which are movable relative to each other in at least one measuring direction, the effective measuring point of the scanning is spaced apart from the measuring standard at a defined distance in the particular direction that has an orientation that faces away from the scanning head.

10 Claims, 11 Drawing Sheets

OPTICAL POSITION MEASURING DEVICE

CROSS-REFERENCE TO RELATED APPLICATIONS

The present application claims priority to Application No. 10 2013 014 914.2, filed in the Federal Republic of Germany on Sep. 11, 2013, and to Application No. 10 2014 208 988.3, filed in the Federal Republic of Germany on May 13, 2014, each of which is expressly incorporated herein in its entirety by reference thereto.

FIELD OF THE INVENTION

The present invention relates to an optical position measuring device, e.g., which is suitable for the highly precise determination of the relative position of two objects that are movable relative to each other.

BACKGROUND INFORMATION

So-called XY tables are frequently used to position planar objects, such as wafers, in semi-conductor production devices. The planar objects lie on sliding carriages that can be moved in linear degrees of freedom X, Y and partially also in a rotary degree of freedom Rz, i.e., in all so-called in-plane degrees of freedom. X and Y denote the movement directions of the sliding carriage that are oriented perpendicularly to each other in the movement plane, and a Z axis is oriented in a direction perpendicular thereto. The rotary degree of freedom Rz of the object thus results from a possible rotary motion of the sliding carriage about the Z axis.

The position of the sliding carriage is often ascertained by grating-based optical position measuring devices, also referred to as encoders, in which a one-dimensional or two-dimensional measuring standard is optically scanned with the aid of one or more scanning head(s). To generate high-resolution position signals, such optical position measuring devices preferably employ interferential scanning principles, in which a bundle of rays emitted by a light source is split into at least two partial bundles of ray, which are superimposed interferentially after impinging upon the measuring standard once or multiple times.

When using an XY table in a machine, the object to be moved must usually be positioned in relation to a stationary tool or sensor. A tool point is thereby defined via the tool or the sensor, which is referred to as tool center point TCP, whose position relative to the object needs to be ascertained. A slight effective interspace between the measuring points of the employed position measuring devices and the TCP of the machine is an important prerequisite to ensure that guidance errors of the sliding carriage do not adversely affect the measuring accuracy in the position determination. This prerequisite is referred to as the so-called Abbe condition and states that the effective measuring point of a position measurement must be aligned with the TCP in the measuring direction. A lateral distance transversely to the measuring direction between the effective measuring point and the TCP is called the Abbe distance and should ideally be zero.

The effective measuring point of a position measuring device is sometimes also referred to as neutral pivotal point, inasmuch as tilting of the scanning head or the measuring standard of a position measuring device about the neutral pivoting point in the linear approximation does not result in a shift of the measured positional value, and thus in an error in the position determination.

If two position measuring devices or encoders using the same measuring direction are employed for the position measurement, whose scanning heads are disposed at a distance perpendicularly to the common measuring direction, then a weighted mean value generation of the two measured positional values makes it possible to shift the effective measuring point along the connecting line of both measuring points. Correspondingly, it is possible to use three stationary scanning heads, two of which detect measuring direction Y and one of which detects the measuring direction X of a sliding carriage, to arbitrarily shift the effective measuring points for the position determination in the XY plane through the three effective measuring points by linear combinations of the three measured positional values. In the following text, this XY plane is therefore also referred to as an effective measuring plane of the three scanning heads or the position measuring devices. The only prerequisite for this is that the two scanning heads having the same measuring direction are offset transversely to their measuring direction, and that all effective measuring points of the three scanning heads are arranged in a common plane parallel to the two measuring directions. Through the choice of the aforementioned linear combinations, the effective measuring points are shifted such that, in the effective measuring plane, each has a minimum Abbe distance for both measuring directions. In this manner, the effective measuring point lies at the same X and Y position as the TCP. Only an Abbe distance in the Z direction has so far been unable to be eliminated. Such a position determination using three stationary scanning heads is already known, especially in connection with two-dimensional cross-grating measuring standards. In an analogous manner, however, it is also possible that the scanning heads are jointly secured on the movable sliding carriage and scan a cross-grating measuring standard that is fixed in place.

PCT International Published Patent Application No. WO 2011/068254 describes an XY table, which includes a measuring standard, arranged as a cross grating, on the underside of the sliding carriage, which is moved by the sliding carriage and optically scanned by three stationary scanning heads mounted underneath the sliding carriage. Two of the three stationary scanning heads measure along the Y direction, as previously described, and the third scanning head measures along the X direction. This allows a precise in-plane measurement of the XY table in the effective measuring plane of the encoders. However, because of the employed scanning optics of the encoders, the effective measuring points, and thus the effective measuring plane of the encoders, lie in the plane of the cross grating measuring standard. The TCP, on the other hand, lies on the topside of the object or wafer situated on the sliding carriage and therefore has a large Abbe distance in the Z direction in relation to the effective measuring plane situated underneath. As a result, a high-precision measurement of the object position relative to the TCP is impossible. Small Rx or Ry tilting of the XY table, i.e., tilting about the X or Y axis, due to unavoidable guidance deviations, cause corresponding positional errors of the object.

The same holds true also for the devices described in European Published Patent Application No. 2 068 112, which describes a transparent XY sliding carriage, on whose topside a cross grating is applied as a measuring standard, which is optically scanned from below, through the transparent sliding carriage substrate, by three stationary scanning heads. The cross grating measuring standard is therefore arranged as a so-called rear surface grating. The object to be positioned, in the form of a wafer, lies on the topside of the transparent XY sliding carriage. In the devices proposed in European Published Patent Application No. 2 068 112, as well, the effective measuring point of the scanning heads in the Z direction therefore fails to coincide with the TCP. A precise examination of the proposed scanning reveals that given a thickness of the transparent sliding carriage substrate in the range of 30 mm to 100 mm, Abbe distances in the order of magnitude of 10 mm to 33 mm result in the Z direction. Given typical guidance variations of approximately 25 μrad with regard to the Rx and Ry tilting, measuring errors of 250 nm to 825 nm arise in the position determination, which is unacceptable for the typically high positioning specifications in applications of this type.

SUMMARY

Example embodiments of the present invention provide an optical position measuring device in which the position of the effective measuring point is adjustable, and which ensures, especially with regard to the Abbe condition to be observed, a low Abbe distance between the effective measuring point of the position measuring device and a tool center point of a tool in the individual machine.

According to example embodiments of the present invention, a position measuring device for detecting the relative position of a measuring standard and at least one scanning head, which are able to move relative to each other along at least one measuring direction, includes optical scanning that is arranged such that the effective measuring point of the scanning is spaced apart from the measuring standard at a defined distance in the particular direction that is orientated so as to face away from the scanning head.

In this context, it is possible that a bundle of rays is split into two partial bundles of rays for the optical scanning of the measuring standard, and each of the two partial bundles of rays impinges at least once upon a reflection grating of the measuring standard and is thereby diffracted such that a bisecting line between the partial bundle of rays incident on the reflection grating and reflected back thereby intersects an optical axis in a point that lies on the side of the measuring standard that faces away from the scanning head and represents the effective measuring point of the scanning.

In this context, it may be provided that: splitting of the bundle of rays into the two partial bundles of rays takes place at least prior to the reflection grating impingement; in a diffraction that is taking place at the reflection grating, each partial bundle of rays is deflected away from the optical axis; and via at least one deflection element, a deflection back to the optical axis takes place, where the partial bundles of rays are recombined.

The divided partial bundles of rays may extend symmetrically with respect to the optical axis between the splitting and the recombination.

It is furthermore possible that the measuring standard is arranged as a rear surface grating and includes a plate-shaped transparent substrate as well as a reflection grating whose reflecting side is oriented in the direction of the substrate and in the direction of the scanning head.

Moreover, it is possible that the measuring standard is arranged as a front surface grating and includes a reflection grating whose reflecting side is oriented in the direction of the scanning head.

It may furthermore be provided that: the measuring standard is movable in relation to a first scanning head along a first measuring direction; and the measuring standard is movable in relation to a second scanning head along a second measuring direction, the second measuring direction having an orientation that is orthogonal to the first measuring direction.

The measuring standard may furthermore be movable in relation to a third scanning head along the first or second measuring direction.

In addition it is possible that the measuring standard is arranged as a cross grating.

The scanning head may include a light source, a plurality of detector elements, and a scanning plate, which has a splitting grating as well as a combination grating on one side and multiple further gratings on the opposite side, so that: a bundle of rays emitted by the light source is split up into two partial bundles of rays via the splitting grating; the partial bundles of rays then propagate in the direction of a grating on the opposite side of the scanning plate and are thereby deflected in the direction of the optical axis; they then propagate further in the direction of the measuring standard, where a diffraction and back-reflection in the direction of the scanning head results; the partial bundles of rays are each deflected in the direction of the optical axis via further gratings and propagate in the direction of the combination grating on the opposite side of the scanning plate, where they are interferentially superimposed; and superimposed partial bundles of rays propagate from the combination grating in the direction of the detector elements, via which phase-shifted scanning signals are able to be detected.

Example embodiments of the present invention may be used to reduce the Abbe distance to virtually zero, for example when is used in connection with XY tables. This results in very high accuracy in the position determination with regard to the object that is positioned with the aid of the XY table.

The position measuring device may have a flexible configuration and may include different measuring standards. For example, it is possible to configure the corresponding scanning optics of the position measuring device for measuring standards that are arranged as rear surface gratings or as front surface gratings. In both cases, it may thereby be ensured that the effective measuring plane of the corresponding position measuring device is situated beyond the rear side of the measuring standard. This makes it possible to place the object to be positioned, such as a wafer, in the effective measuring plane. All Abbe distances for XY tables may thus be reducible to nearly zero and the Abbe condition can be complied with. The resulting high measuring precision in the position determination may be minimally affected by guidance deviations of the XY table.

Since the guidance deviations no longer have any significant effect on the position determination, less complicated guidance mechanisms having correspondingly larger tolerances can be used. Since high-precision guidances represent a considerable portion of the production costs of an XY table, the costs can therefore be reduced significantly.

Further features and aspects of example embodiments of the present invention are described in more detail below with reference to the appended Figures.

DETAILED DESCRIPTION

Before individual exemplary embodiments of the optical position measuring device are described in greater detail below, first some basic theoretical considerations related thereto will be discussed with reference to FIGS. 1 and 2, which illustrate part of the scanned optical path in an exemplary embodiment of the optical position measuring device.

In a high-resolution optical position measuring device based on an interferential scanning principle, a bundle of rays supplied by a light source is usually collimated and split up into two partial bundles of rays. The partial bundles of rays are deflected in different orders of diffraction at a measuring standard and ultimately made to interfere through superimpositioning, from which phase-displaced position-dependent scanning signals are derived.

Figure 1:
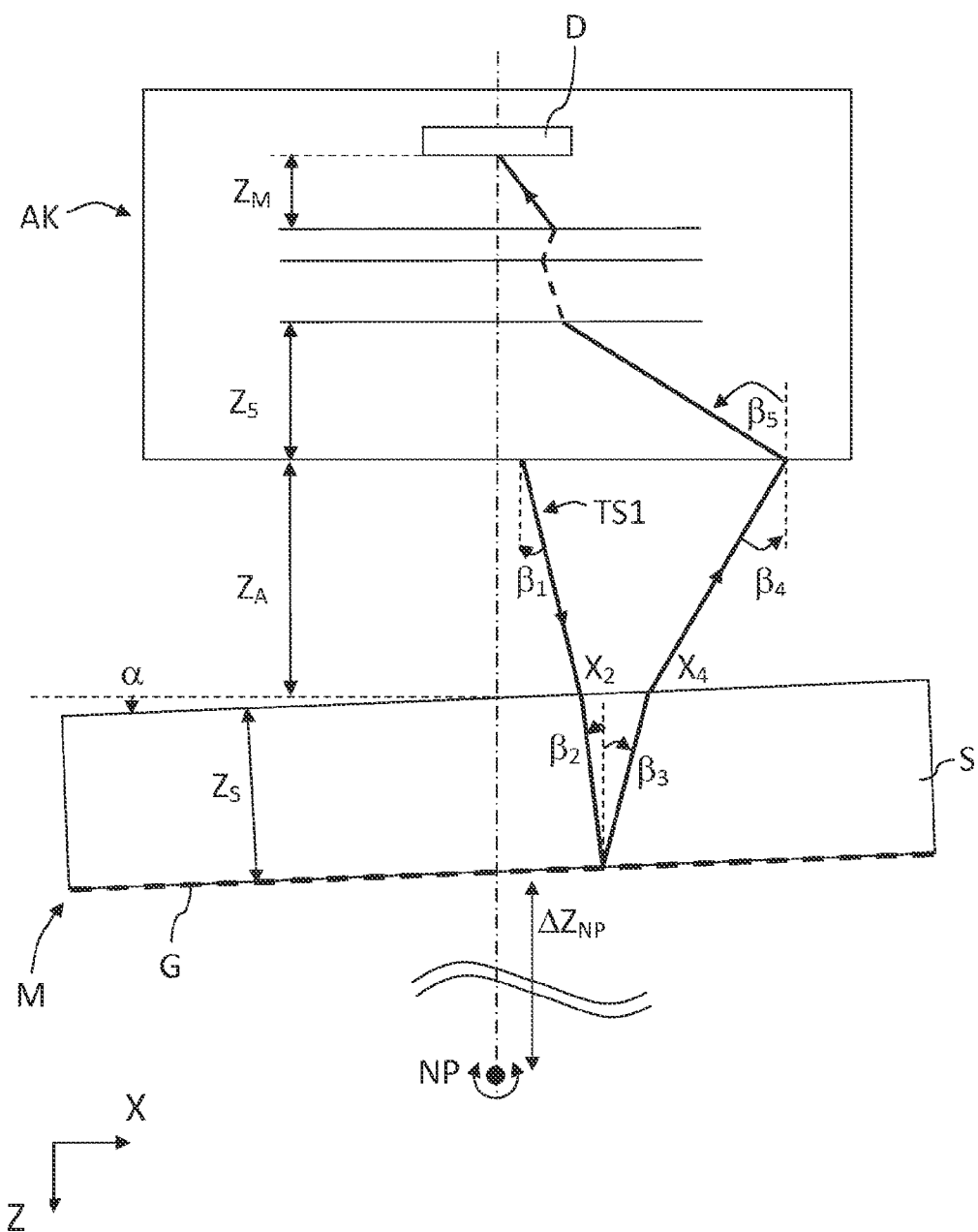
FIGS. 1 and 2 schematically illustrate an optical path for describing theoretical considerations in connection with the optical position measuring device.
Figure 2:
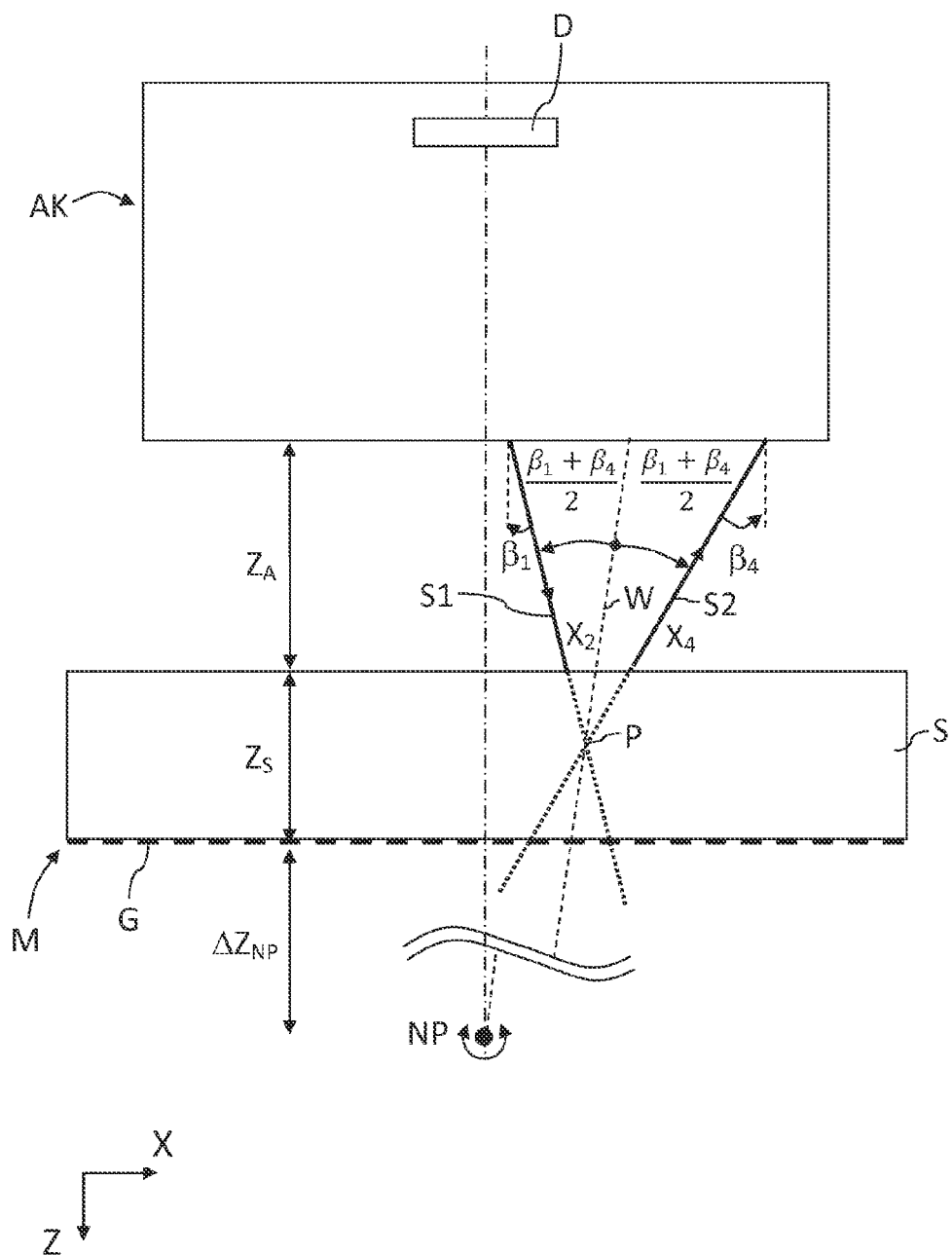

FIG. 1 partially illustrates the optical path of an exemplary optical position measuring device, which includes a measuring standard M arranged as a rear surface grating. The rear surface grating includes a plate-shaped transparent substrate S and a reflection grating G, whose reflecting side is oriented in the direction of substrate S or in the direction of scanning head AK, which is movable in relation to measuring standard M at least along measuring direction X. With the aid of this illustration, the position of effective measuring point NP of this position measuring device will be explained initially.

It is assumed that the optical path of the two split-up partial bundles of rays extends in symmetry with optical axis Z, so that it will suffice hereinafter to examine only the particular bundle of rays that is deflected at measuring standard M into the +1 order of diffraction and is designated by TS1 in FIG. 1. Measuring standard M is tilted about the Y axis at an angle $\alpha$. Examined partial bundle of rays TS1 emerges from scanning head AK at an angle $\beta_1$ with respect to optical axis Z, and lands on the transparent topside of measuring standard M, which is arranged as a rear surface grating. From there it is deflected at an angle $\beta_2$ in relation to optical axis Z by refraction at the boundary surface of air/substrate S and then continues to propagate through substrate S to rear-side reflection grating G of measuring standard M. There, it is reflectively diffracted at a first order of diffraction at an angle $\beta_3$ with respect to optical axis Z, and deflected, through renewed refraction at the boundary surface substrate S/air at the topside of the measuring standard, at an angle $\beta_4$ in relation to optical axis Z. Partial bundle of rays TS1 then propagates to scanning head AK, where further optical components such as deflection gratings and combination gratings deflect it at the intervals $Z_2, Z_2, \ldots Z_{M-1}$ along optical axis Z. Finally, it is superposed on optical angle Z at location Z=ZM by the second partial bundle of rays, which propagates in symmetry with first bundle of rays TS1 in relation to optical axis Z. Via a post-connected detector system D, the displacement-dependent scanning signals are recorded.

The phase shift of the examined partial bundle of rays TS1 resulting in the optical path is most easily calculated at locations along optical axis Z. It results as the sum of individual phase shift absolute amounts of the form $k_Z \cdot \Delta z$, $k_Z$ denoting the Z component of the k vector of a subsegment of the optical path, and $\Delta z$ denoting the associated Z extension of the subsegment at the location of optical axis Z. In this manner, the following is obtained for the resulting phase shift $\Phi$ of partial bundle of rays TS1:

$$\Phi = \phi_1 + k_0 \cdot Z_A \cdot \cos(\beta_1) + k_0 \cdot n_S \cdot Z_S \cdot \cos(\beta_2) + k_0 \cdot n_S \cdot Z_S \cdot \cos(\beta_3) + k_0 \cdot Z_A \cdot \cos(\beta_4) + k_0 \cdot \Sigma_{m=5}^{M} n_m \cdot Z_m \cdot \cos(\beta_m)$$ (eq. 1)

where:

$\phi$ represents the resulting phase shift of partial bundle of rays TS1 between the splitting and the superimpositioning with the other partial bundle of rays;

$\phi_1$ represents the phase shift of partial bundle of rays TS1 upon emergence from the scanning head;

$K_0 = 2\pi/\lambda$;

$\lambda$ represents the wavelength of the light source;

$Z_A$ represents the scanning clearance between scanning head AK and topside of measuring standard M;

$Z_S$ represents the thickness of substrate S of measuring standard M;

$n_S$ represents the refractive index of substrate S of measuring standard M;

$\beta_1, \beta_2, \ldots \beta_M$ represent the angle of the subsegments of partial bundle of rays TS1 in relation to optical axis Z;

$n_5, n_6, \ldots n_M$ represent the refractive indices of the optical components in scanning head AK through which partial bundle of rays TS1 passes; and $Z_5, Z_6, \ldots Z_M$ represent the associated clearances of the components in scanning head AK.

Due to the tilting of measuring standard M about the small angle $\alpha$, there is a change in the angles $\beta_2, \beta_3, \ldots \beta_M$ of the subsegments of partial bundle of beams TS1. The following relationships result:

$$n_S \cdot \sin(\beta_2 - \alpha) = \sin(\beta_1 - \alpha)$$ (eq. 2.1)

$$n_S \cdot \sin(\beta_3 + \alpha) = n_S \cdot \sin(\beta_2 - \alpha) + \frac{\lambda}{d_S}$$ (eq. 2.2)

$$\sin(\beta_4 + \alpha) = n_S \cdot \sin(\beta_3 + \alpha)$$ (eq. 2.3)

$$n_{m+1} \cdot \sin(\beta_{m+1}) = n_m \cdot \sin(\beta_m)$$ (eq. 2.4)

where $d_S$ represents the grating period of measuring standard M.

At small tilting angles $\alpha$ of measuring standard M, the phase of partial bundle of rays TS1 is shifted in linear approximation by $$\frac{\partial \phi}{\partial \alpha} \cdot \alpha.$$

In tilting about effective measuring point NP of the position measuring device this phase shift must be compensated by an oppositely directed phase shift $\phi_X$ which results from an X shift of measuring standard M. If effective measuring point NP according to FIG. 1 lies at a distance $\Delta Z_{NP}$ below measuring standard M, then slight tilting $\alpha$ about this effective measuring point NP shifts measuring standard M in the X direction by $\Delta Z_{NP} \cdot \alpha$. The associated phase shift $\phi_X$ of partial bundle of rays TS1 therefore is:

$$\phi_X = \frac{2\pi}{d_s} \cdot \Delta Z_{NP} \cdot \alpha \qquad \text{(eq. 3)}$$

The compensation of phase shift $$\frac{\partial \phi}{\partial \alpha} \cdot \alpha$$

by phase shift $\phi_X$ results in the following condition:

$$0 = \frac{\partial \phi}{\partial \alpha} \cdot \alpha + \frac{2\pi}{d_s} \cdot \Delta Z_{NP} \cdot \alpha \qquad \text{(eq. 4)}$$

Distance $\Delta Z_{NP}$ of effective measuring point NP of the position measuring device from measuring standard M along the Z direction is able to be calculated on this basis. Using the equations 1, 2.1 to 2.4, and 4, the following results:

$$\Delta Z_{NP} = -Z_S + \frac{X_2 \cdot \cos(\beta_1) + X_4 \cdot \cos(\beta_4)}{\sin(\beta_4) - \sin(\beta_1)} \qquad \text{(eq. 5)}$$

Equation 5 thus describes the relationship between the distance of effective measuring point NP of the optical position measuring device present invention and different system parameters of the employed scanning optics. Through a suitable selection of the scanning optics using system parameters $Z_S, X_2, X_4, \beta_1$ and $\beta_2$, it is therefore possible to place effective measuring point NP at the position desired for the individual application.

The position of effective measuring point NP according to equation 5 corresponds to the following geometrical determination of the position of effective measuring point NP, which is illustrated with reference to FIG. 2. In FIG. 2, only segments S1, S2 of partial bundle of rays TS1 that extend from scanning head AK to measuring standard M and back again are illustrated. Segments S1, S1 are extended accordingly and intersect at point P in substrate S of measuring standard M. Bisecting line W of the two segments S1, S1 intersects optical axis Z precisely in effective measuring point NP.

In position measuring devices whose split partial bundles of rays impinge upon measuring standard M multiple times, it is possible to use above equation 5 in an analogous manner. According to equation 5, a separate effective measuring point is able to be determined for each impingement of measuring standard M. Such an individual effective measuring point corresponds to the theoretical case that the measuring standard could be tilted independently at each impingement location of the two partial bundles of rays. The resulting effective measuring point of the position measuring device is obtained from an arithmetic mean value generation of the individual effective measuring points, which geometrically corresponds to forming the point of concentration of the individual effective measuring points.

Using the above equation 5 or the analogous geometrical determination explained with reference to FIG. 2, the effective measuring point of the device described in European Patent Application No. 2 068 112, mentioned above, is easily ascertainable for a measuring standard having a rear surface grating. The largest and thus most advantageous value of distance $\Delta Z_{NP}$ of the effective measuring point of the position measuring device from the measuring standard along the Z direction is $$\Delta Z_{NP} = -Z_S \cdot \frac{n_S - 1}{n_S},$$

which, with $n_S=1.5$, results in a value $\Delta Z_{NP}=-Z_S/3$. Thus, the effective measuring point always lies far within the substrate of the measuring standard and therefore at an unacceptably far distance from TCP in the Z direction. In other words, correspondingly large Abbe distances result in relation to the TCP and thus, considerable measuring errors in the position determination. This is furthermore due to the fact that it is not taken into account in the configuration of the scanning optics that the split-up partial bundles of rays experience different phase shifts in case of an Rx or Ry tilting of the measuring standard, due to the passage through the transparent substrate.

Therefore, the following condition must be observed for an effective measuring point NP of the position measuring device that lies on reflection grating G of measuring standard M or else, even farther away from scanning head AK along the Z direction:

$$\Delta Z_{NP} \geq 0 \qquad \text{(eq. 6)}$$

Equations (5) and (2) therefore yield:

$$X_2 \cdot \cos(\beta_1) + X_4 \cdot \cos(\beta_4) \geq \frac{\lambda}{d_S} Z_S \qquad \text{(eq. 7)}$$

If angles $\beta_1$ and $\beta_2$ are smaller than 25°, equation 7 may be approximated as follows:

$$X_2 + X_4 \geq \frac{\lambda}{d_S} Z_S \qquad \text{(eq. 8)}$$

This approximation means that the balance point $$\frac{X_2 + X_4}{2}$$

of the two impingement points of a partial bundle of rays on the topside of measuring standard M must be situated farther away from optical axis Z than a value $$2 \frac{\lambda}{d_S} Z_S.$$

In the case of measuring standards arranged as front surface gratings, $Z_S=0$, since no transparent substrate in front of the reflection grating needs to be taken into account. However, thickness $Z_B$ of the rear-side measuring standard substrate must be examined in such a case. The effective measuring point must lie outside the rearside measuring standard substrate in order to be able to introduce the object to be moved there. If $\Delta Z_{NP}$ once again denotes the distance of the effective measuring point from the grating of the measuring standard, then the following modified conditions must apply instead of equations 6 to 8:

$$\Delta Z_{NP} \geq Z_B \qquad \text{(eq. 6')}$$

In the case of a measuring standard arranged as a front surface grating, $X_4 = X_2$ applies, so that it follows according to the equations 5 and 2:

$$X_2 \cdot (\cos(\beta_1) + \cos(\beta_4)) \geq \frac{\lambda}{d_S} Z_B \quad \text{(eq. 7')}$$

If angles $\beta_1$ and $\beta_2$ are once again smaller than 25°, equation 7 may be approximated as follows:

$$2 \cdot X_2 \geq \frac{\lambda}{d_S} Z_B \quad \text{(eq. 8')}$$

The equations 6' to 8' result from the equations 6 to 8 by the simple substitutions $Z_S \rightarrow Z_B$, $X_4 \rightarrow X_2$.

Through the corresponding configuration of the scanning optics of a position measuring device, it is possible to set the position of its effective measuring point along the Z direction in a defined manner and, in particular, to adapt it to the position of the TCP in the respective application. One feature of a correspondingly configured scanning optics system of a position measuring device is that the two partial bundles of rays are already split up before they impinge upon the measuring standard and that, in the diffraction at a measuring standard arranged as a rear surface or front surface grating in each case, they are deflected even farther away from optical axis Z, instead of being deflected toward optical axis Z, as usual in such systems. In addition to a splitting grating and a combination grating, at least one additional deflection element is required as further optical component, which is introduced into the optical path either in front of or after the measuring standard. It steers the partial bundle of rays back to the optical axis and in this manner at least partially compensates the deflection by the measuring standard away from the optical axis again. The combination of splitting grating, deflection elements and measuring standard is dimensioned such that the partial bundles of rays reach the optical axis again at the location of the combination grating, where they are able to interfere. If the two partial bundles of rays are reflected multiple times at the measuring standard, then the above feature must be satisfied for at least one of the reflections.

First Exemplary Embodiment

Figure 3A:
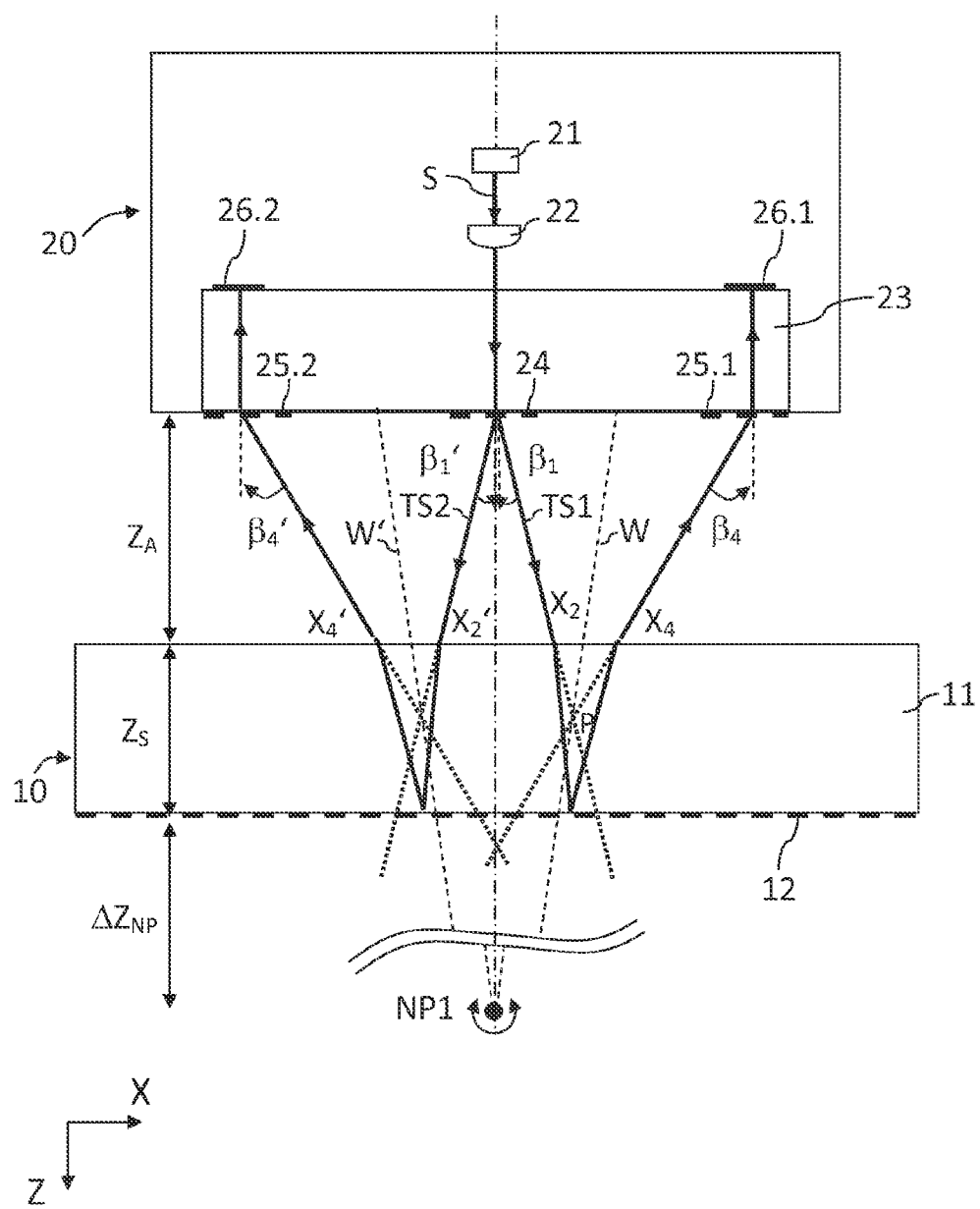
FIGS. 3a to 3c are cross-sectional views of an optical position measuring device according to an example embodiment of the present invention.
Figure 3B:
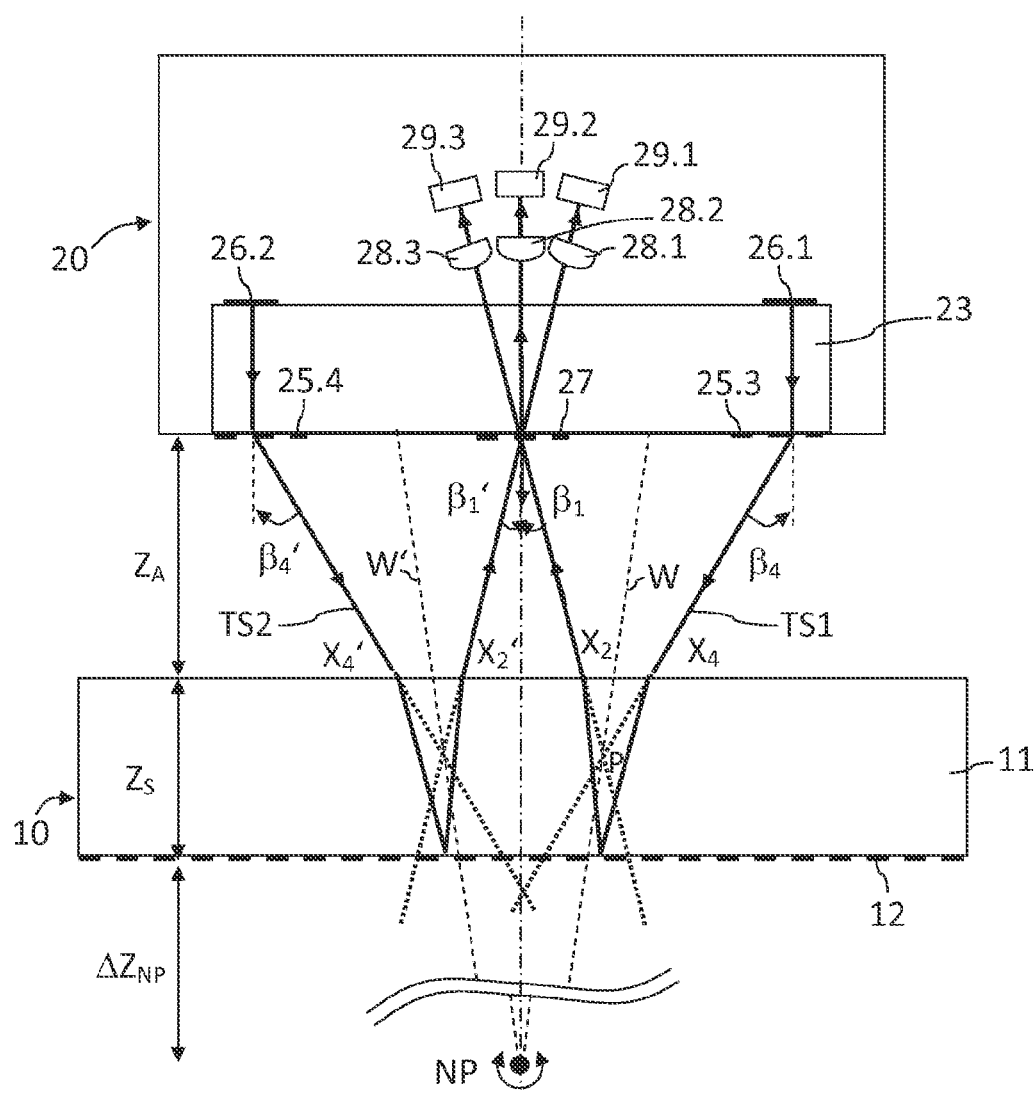
Figure 3C:
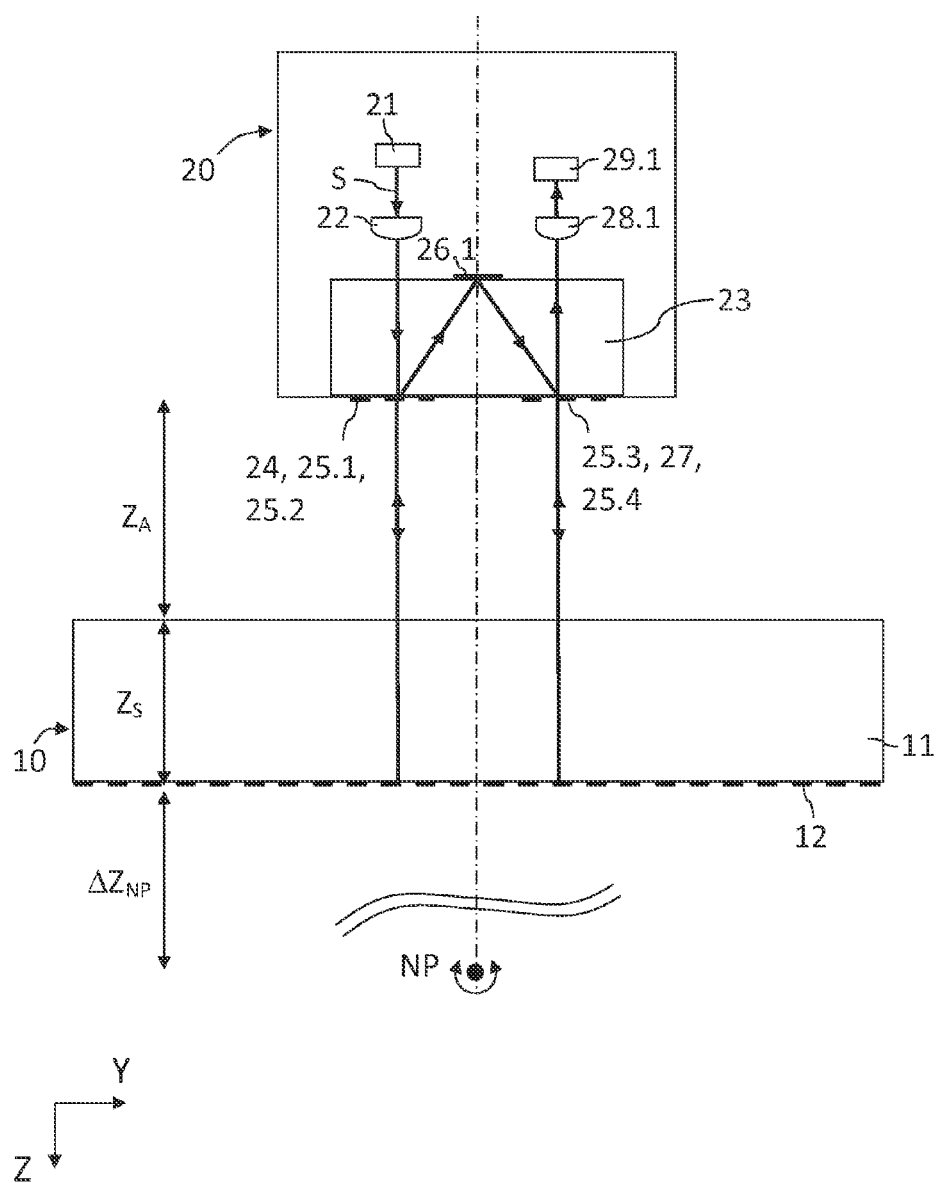

A first exemplary embodiment of the position measuring device is illustrated in various sectional views in FIGS. 3a to 3c. FIG. 3a illustrates the scanning beam path from light source 21 to reflectors 26.1, 26.2, and FIG. 3b correspondingly illustrates the scanning beam path from reflectors 26.1, 26.2 to detector elements 29.1 to 29.3 in an XZ view. FIG. 3c illustrates the entire scanning beam path in an YZ view.

The position measuring device includes a measuring standard 10 and at least one scanning head 20. Measuring standard 10 and scanning head 20 are movable relative to each other at least along the X axis, i.e., at least along one measuring direction, and, for example, are connected to movable components of a machine that must be positioned in relation to each other.

For example, this may be the XY table of a semiconductor production device, which is disposed so as to allow movement along the X and Y directions oriented perpendicularly to each other, i.e., along two measuring directions, and on which measuring standard 10 is mounted, which in this instance is provided as a two-dimensional cross grating. In such a case, at least two scanning heads, via which the measuring standard is optically scanned and positional signals for a downstream motor control are generated, are provided on a stationary component of the semiconductor production device.

For reasons of clarity, the example embodiment illustrated in FIGS. 3a to 3c represents the case in which only the relative movement of scanning head 20 and measuring standard 10 along a single measuring direction X is detected and a one-dimensional measuring standard 10 and a single scanning head 20 are provided for this purpose.

In the exemplary embodiment illustrated, measuring standard 10 is arranged as a rear surface grating and includes a plate-shaped transparent substrate 11 and a reflection grating 12. The reflective side of reflection grating 12 is oriented in the direction of substrate 11 and is scanned from the direction of substrate 11, that is to say, light from the direction of substrate 11 impinges upon reflection grating 20 from the direction of scanning head 20. Reflection grating 20 includes scale graduations of different step levels or different reflectivity that are periodically disposed along measuring direction X.

In the case of the desired detection of relative movements along at least two measuring directions, the measuring standard would have to be conventionally arranged as a two-dimensional cross grating, and at least two scanning heads would have to be provided, the plurality of scanning heads basically having the same configuration but different orientations.

Disposed in scanning head 20 of the illustrated first exemplary embodiment of the optical position measuring device are a light source 21, a collimating optical system 22, a scanning plate 23 having different gratings 24, 25.1 to 25.4, 27, and reflectors 26.1, 26.2, optical systems 28.1 to 28.3, as well as detector elements 29.1 to 29.3.

In the following text, the scanning beam path in the first exemplary embodiment of the optical position measuring device is described.

Bundle of rays S of light source 21 is collimated by collimating optical system 22 and lands on a splitting grating 24. There, it is split up into two partial bundles of rays TS1, TS2, whose further beam bath is symmetrical with the YZ plane. Partial bundle of rays TS1 deflected in the +X direction lands on the transparent topside of measuring standard 10, is refracted there and propagates through substrate 11 to rear-side reflection grating 12 of measuring standard 10. Here, it is also reflectingly diffracted in the +X direction in the +1 order of diffraction and then once again lands on the transparent topside of measuring standard 10, where it is refracted anew. Partial bundle of rays TS1 thereupon propagates to a grating 25.1 in scanning head 20, which, as explained, functions as deflection element in this exemplary embodiment. Grating 25.1 includes multiple optical functions as superposed diffractive structure. For one, it steers partial bundle of rays TS1 in the X direction, parallel to optical axis Z, while it deflects and focuses partial bundle of rays TS1 onto a reflector 26.1 in the Y direction. Following the reflection at reflector 26.1, it lands on grating 25.3 functioning as further deflection element, which collimates it again in the Y direction, aligns it parallel with optical axis Z and deflects it in the X direction. Partial bundle of rays TS1 then propagates to measuring standard 10 for a second time, where it is refracted on the topside and diffracted anew at reflection grating 12 in the +1 order of diffraction. Following a fourth diffraction at the topside of measuring standard 10, it lands on combination grating 27, where second bundle of rays TS2, which is propagating in symmetry with the YZ plane since the splitting, lands. A combination grating 27 brings both partial bundles of rays to interference, and three partial bundles of rays emerge superimposed in the resulting −1, 0, and +1 order of diffraction, which are imaged via suitable optical systems 28.1 to 28.3 on detector elements 29.1 to 29.3, which generate corresponding scanning signals. By suitable selection of the grating bar pitches and grating bar heights of combination grating 27, it is possible to conventionally adjust the phase shift between the generated scanning signals in a defined manner. This phase shift should ideally amount to 120° in each instance. The further processing of the scanning signals may be accomplished in, e.g., a conventional manner, and corresponding positional values result on the output side.

According to FIGS. 3a and 3b, the optical paths of the two partial bundles of beams TS1, TS2 are identical in the XZ projection from the split-up to reflectors 26.1, 26.2 and from there, to the beam combination. Both optical paths may be assigned effective measuring points NP1 or NP2 in each case. Since they have identical Z positions, the linked optical path also has a resulting effective measuring point NP at the same Z distance. In the Y direction, however, resulting effective measuring point NP lies in the point of concentration between the two Y ray locations of the first and second reflection at reflection grating 12.

Because of the above-described configuration of the scanning optics according to equation 7, the resulting effective measuring point NP of the illustrated exemplary embodiment lies at a relatively great distance $\Delta Z_{NP}$ from measuring standard 10 on the side facing away from scanning head 20. Effective measuring point NP lies at the intersection of the two bisectrices W and W' of the optical paths of partial bundles of rays TS1, TS2 on optical axis Z. Because of the large distance $\Delta Z_{NP}$, a wafer surface to be processed, for example, or some other object to be processed or measured is able to be placed and positioned at this distance with particularly high precision. In case of multiple measuring directions to be detected, it is advantageous in this context to provide the reflection grating of measuring standard 10, which is arranged as a rear surface grating, as a cross grating. Using at least three scanning heads, each measuring direction being assigned at least one scanning head, it is then possible to measure each point on the particular object side with Abbe distances of virtually zero.

Second Exemplary Embodiment

Figure 4:
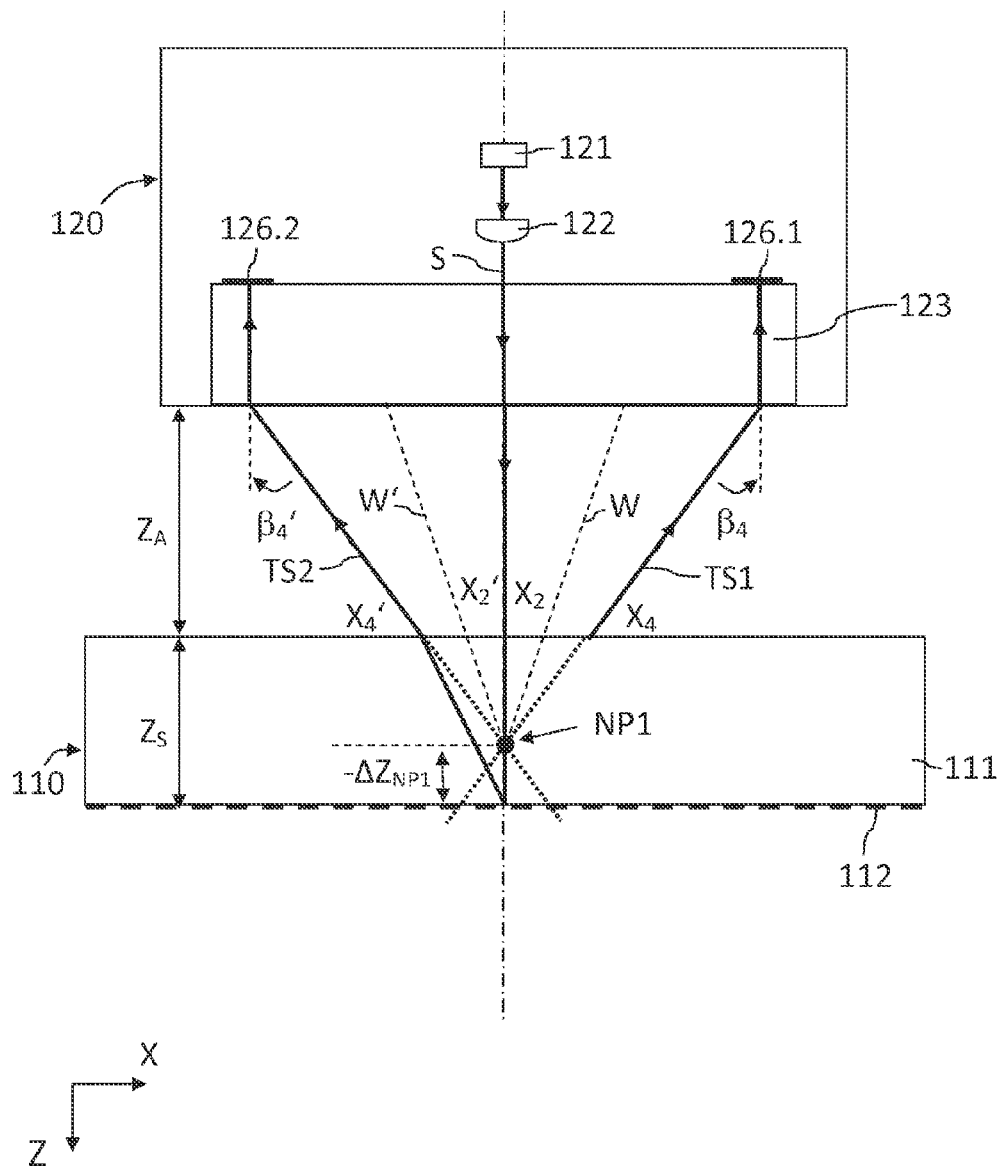
FIG. 4 is a cross-sectional view of an optical position measuring device according to an example embodiment of the present invention.

A second exemplary embodiment of the optical position measuring device is illustrated in a cross-sectional view in FIG. 4. In the following text, only significant differences with respect to the previously described first exemplary embodiment are discussed.

Since the two partial bundles of rays in the first exemplary embodiment must pass through multiple gratings in the optical path, a reduction in the intensity of the partial bundles of rays may result and, accordingly, reduced signal strength. It is therefore advantageous to reduce the number of traversed gratings. One option in this regard is provided in the second exemplary embodiment. FIG. 4 illustrates only the optical path from light source 121 to reflectors 126.1, 126.2 of this example. The further optical path is identical with the optical path illustrated in FIG. 3b of the first exemplary embodiment. Also identical in this exemplary embodiment is the transverse view of the scanning optical path according to FIG. 3c.

In the second exemplary embodiment of the optical position measuring, the previously provided splitting grating in the scanning head, via which the bundle of rays is split into two partial bundles of rays, is omitted. Instead, the splitting of bundle of rays S into two partial bundles of rays TS1, TS2 takes place via reflection grating 112 of measuring standard 110, which is once again arranged as a rear surface grating. In this variant, the split-up partial bundles of rays TS1, TS2 thus impinge upon measuring standard 110 only once in the divided optical path. The further optical path is largely identical with the one from the first exemplary embodiment, which is why no further description is provided.

Effective measuring point NP1 assigned to the first reflection at measuring standard 110 lies within transparent substrate 111 of measuring standard 110. According to equation 5 and equation 2, the following is obtained for distance $\Delta Z_{NP1}$:

$$\Delta Z_{NP1} = Z_S \cdot \left( \sqrt{\frac{1 - \left(\frac{\lambda}{d_S}\right)^2}{n_S^2 - \left(\frac{\lambda}{d_S}\right)^2}} - 1 \right) \approx -Z_S \cdot \frac{n_S - 1}{n_S} \quad \text{(eq. 9)}$$

The negative value of distance $\Delta Z_{NP1}$ is overcompensated by a value of distance $\Delta Z_{NP2}$ that is to be adjusted accordingly and has a larger value in absolute terms, so that a positive value $\Delta Z_{NP}$ comes about overall for the resulting effective measuring point of this exemplary embodiment of an optical position measuring device, and the resulting effective measuring point comes to lie on the particular side of measuring standard 110 that is facing away from scanning head 120:

$$\Delta Z_{NP} = \frac{1}{2}(\Delta Z_{NP1} + \Delta Z_{NP2}) > 0 \quad \text{(eq. 10)}$$

In this example, as well, effective measuring point NP of the overall optical path once again, as desired, lies on the side of measuring standard 110 that faces away from scanning head 120. Because of the lower number of gratings through which partial bundles of rays TS1, TS2 must pass altogether, a marked increase in the signal intensity results in practice, and thus considerably lower noise in the position signals.

Third Exemplary Embodiment

Figure 5A:
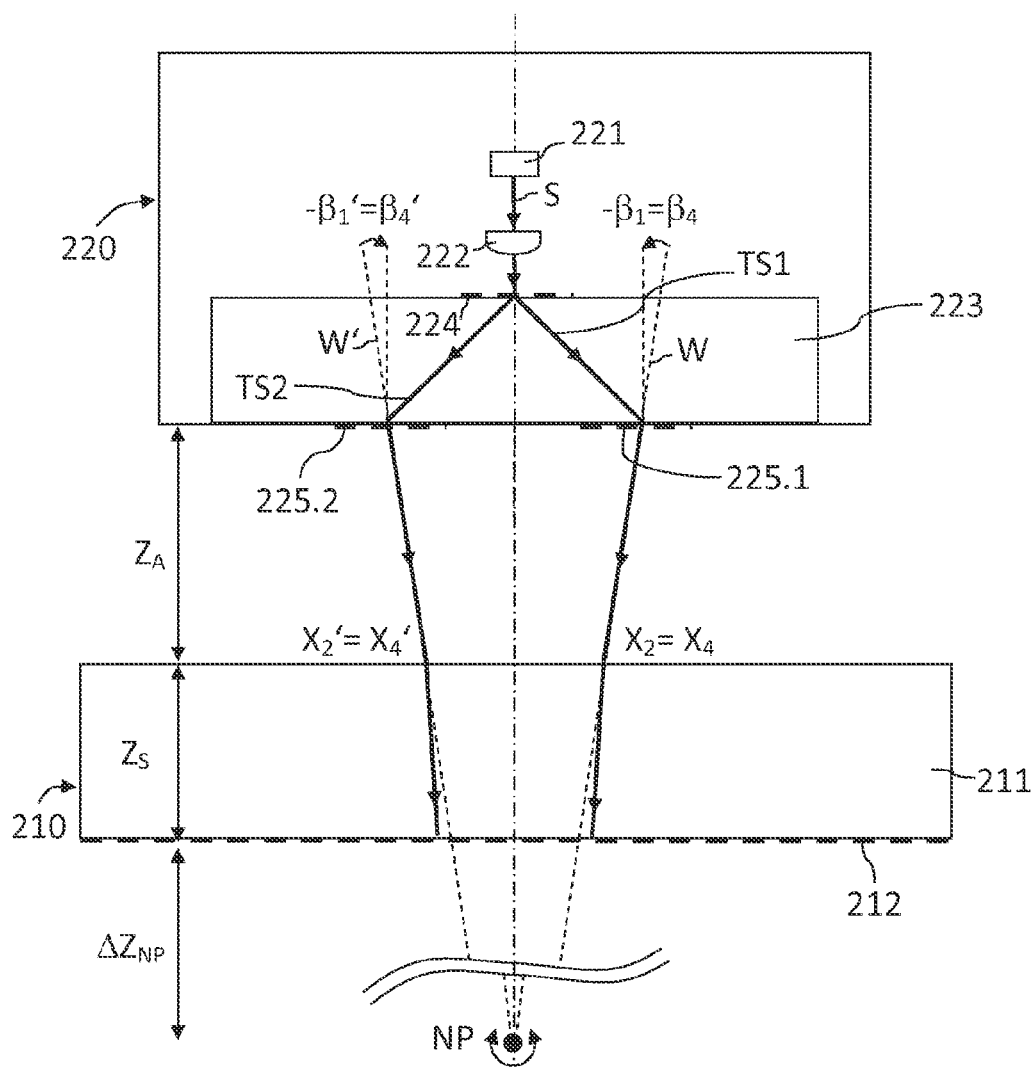
FIGS. 5a to 5c are cross-sectional views of an optical position measuring device according to an example embodiment of the present invention.
Figure 5B:
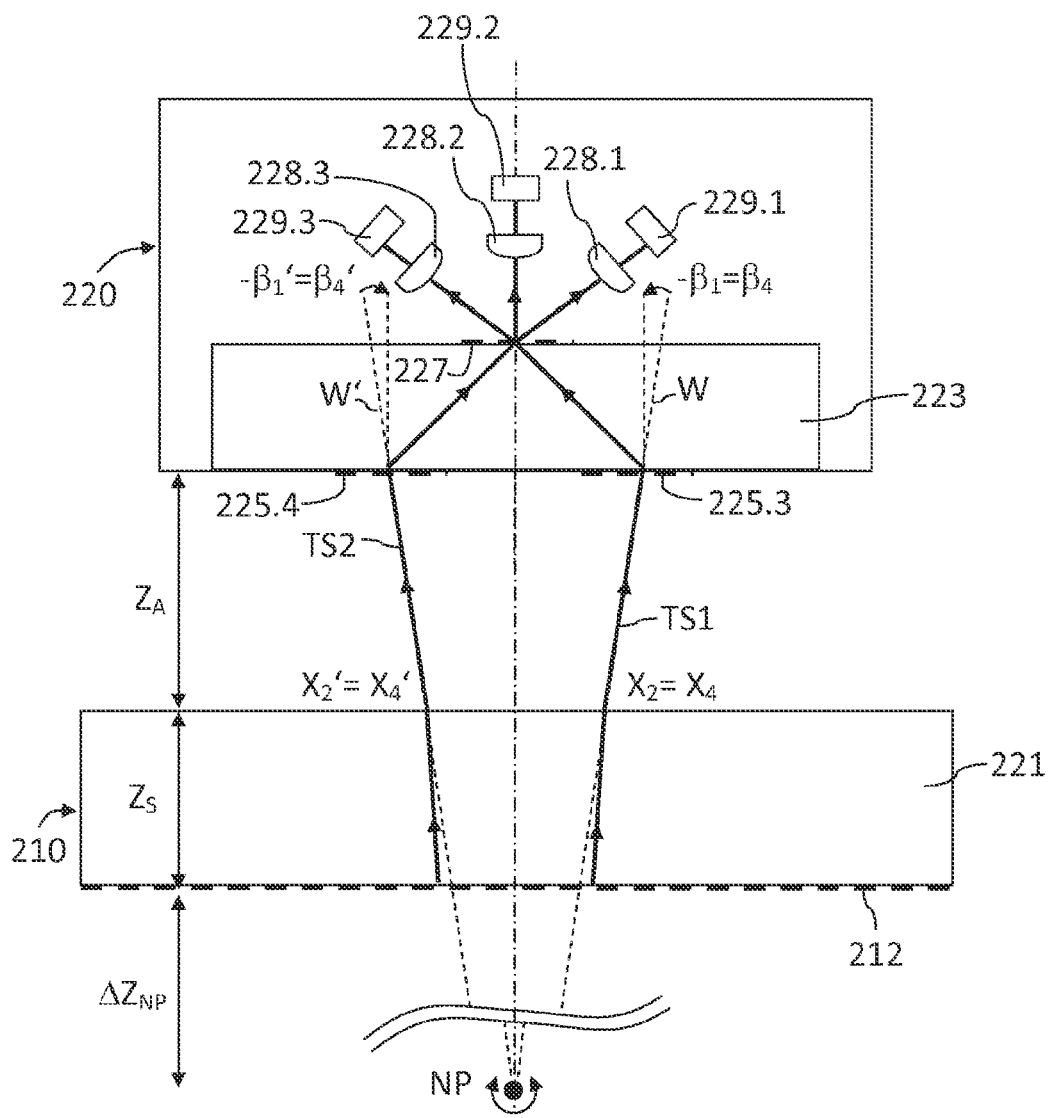
Figure 5C:
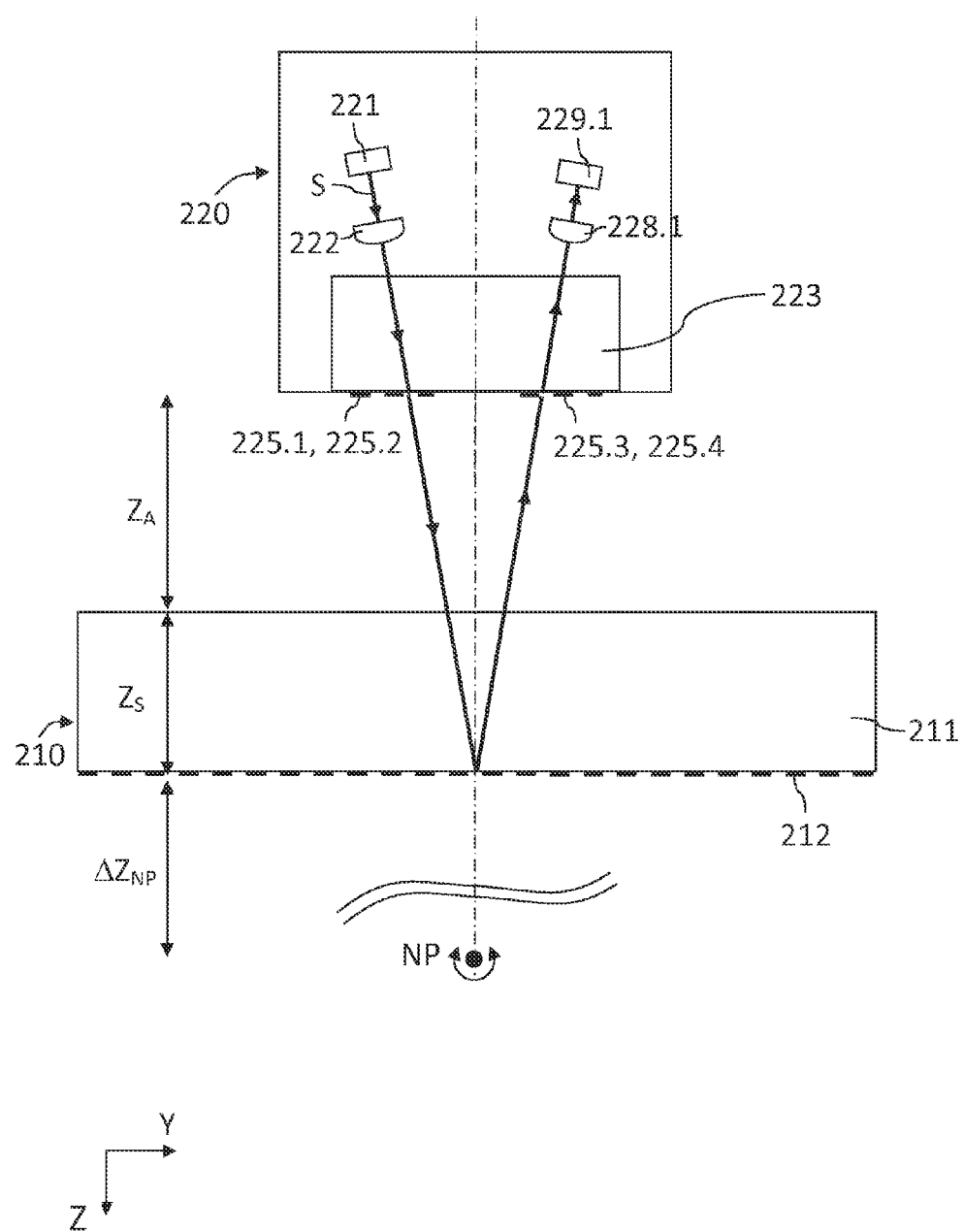

A third exemplary embodiment of the optical position measuring device is illustrated in multiple cross-sectional views in FIGS. 5a to 5c, which correspond to the views of the first exemplary embodiment, i.e., FIG. 5a illustrates the optical path in the XZ projection from light source 221 to reflection grating 212 of measuring standard 210, FIG. 5b illustrates the further optical path illustrates up to detector elements 229.1 to 229.3, and FIG. 5c illustrates the transverse view of the optical path in the YZ projection. In the following text, it will once again be the case that only significant differences from the first exemplary embodiment are discussed.

In the present third exemplary embodiment of the optical position measuring device, the two partial bundles of rays TS1, TS2 are reflected only once at measuring standard 210. A bundle of rays emitted by light source 221 is collimated by a collimating optics system 222 and divided into two partial bundles of rays TS1, TS2 by a splitting grating 224 on the topside of a scanning plate 223. Two further gratings 225.1, 225.2, functioning as deflection elements, on the underside of scanning plate 223 steer the two partial bundles of rays TS1, TS2 inwardly in the direction of desired effective measuring point NP or in the direction of optical axis Z. Partial bundles of rays TS1, TS2 land on the transparent topside of substrate 211 of measuring standard 210, where they are refracted. A diffraction of partial bundles of rays TS1, TS2, into the +1 or −1 order of diffraction, takes place at reflection grating 212 of measuring standard 210, so that the two partial bundles of rays TS1, TS2 travel back in opposing manner in the XZ projection, in the direction of scanning head 220. After a renewed refraction at the transparent topside of substrate 211 of measuring standard 210, two further gratings 225.3, 225.4, which once again serve as deflection elements, on the underside of scanning plate 223 steer them in the direction of optical axis Z, so that both partial bundles of rays TS1, TS2 are finally superimposed at the topside of scanning plate 223 on optical axis Z. They are brought to interference by the diffraction at a combination grating 227. Just like in the first and second exemplary embodiments, the superposed partial bundles of rays TS1, TS2 finally emerge in the resulting −1, 0, and +1 orders of diffraction and are imaged via optical systems 228.1 to 228.3 onto the associated detector elements 229.1 to 229.3, which supply the corresponding position-dependent and phase-shifted scanning signals.

The following relationships apply in this exemplary embodiment:

$$-\beta_1 = \beta_4 \quad \text{(eq. 11.1)}$$

$$X_2 = X_4 \quad \text{(eq. 11.2)}$$

$$\Delta Z_{NP} = -Z_S + \frac{X_2}{\tan(\beta_4)} \quad \text{(eq. 11.3)}$$

A particular advantage of this exemplary embodiment of the optical position measuring device is that effective measuring point NP always lies at a fixed Z distance from scanning head 220 in this case. Its position in particular is not dependent on the Z position of measuring standard 210. Thickness $Z_S$ of substrate 211 of measuring standard 210 does not affect the position of effective measuring point NP either. This variant of the optical position measuring device may therefore also be used in conjunction with a conventional front surface grating or reflection grating as the measuring standard, which is mounted on the underside of an XY table, for example. Due to the fixed Z distance of the effective measuring point to scanning head 220, and depending on the application case, the position of effective measuring point NP is able to be adjusted in a defined manner by a suitable Z shift of scanning head 220. In this manner, the position of the effective measuring point is adjustable to the thickness of the XY table and the object to be positioned thereby, such as a wafer, for example, without the need to modify the scanning optics system.

Fourth Exemplary Embodiment

Figure 6A:
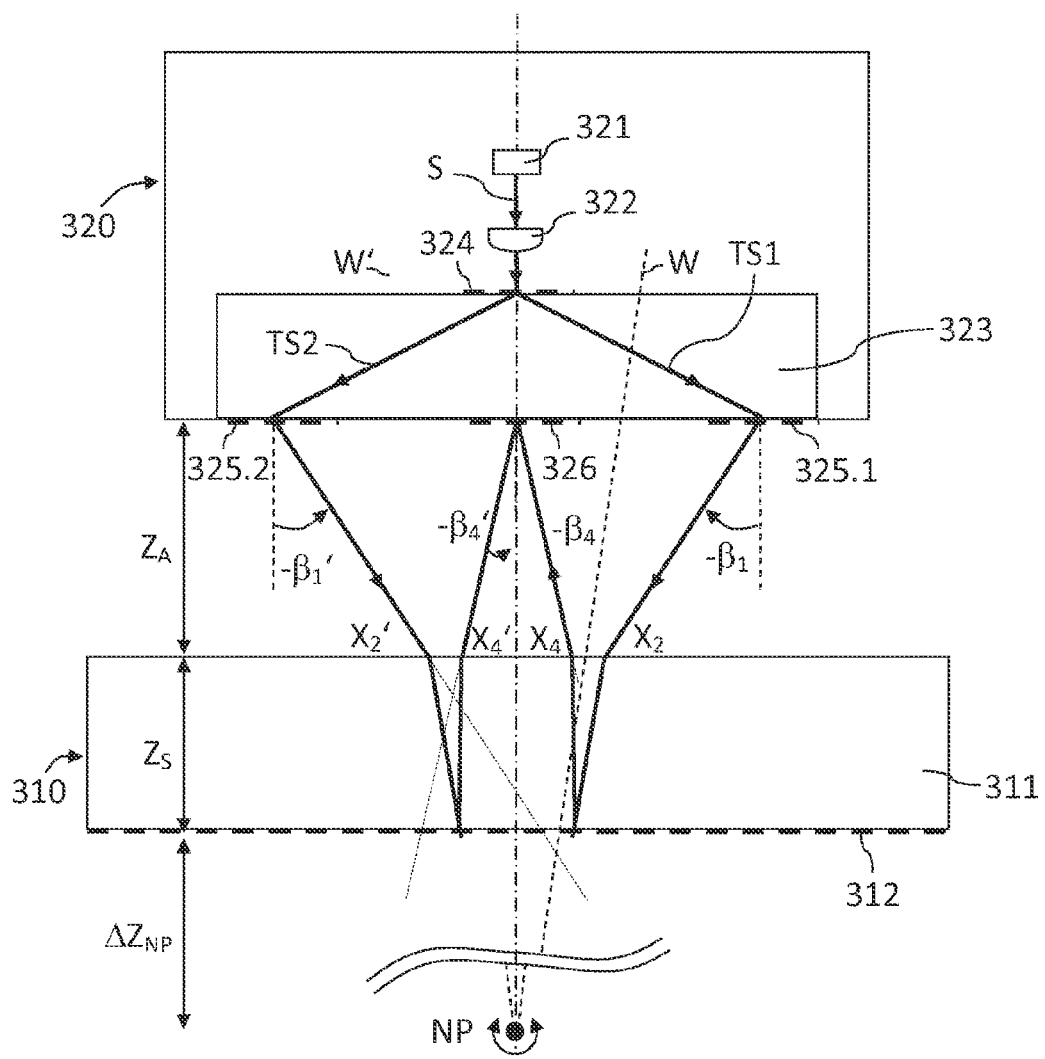
FIGS. 6a and 6b are cross-sectional views of an optical position measuring device according to an example embodiment of the present invention.
Figure 6B:
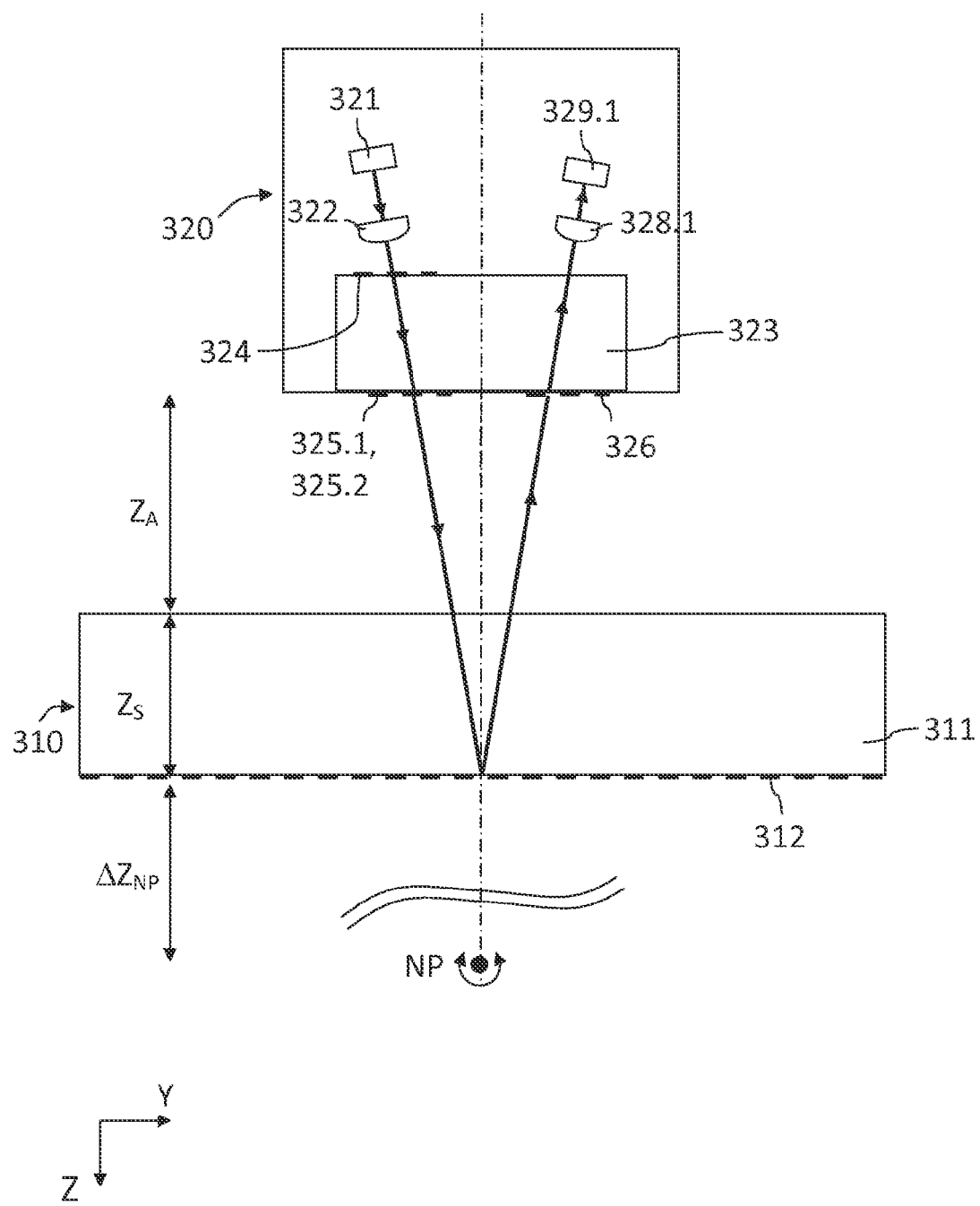

A fourth exemplary embodiment of the position measuring device is illustrated in FIG. 6a in an XZ projection, and in FIG. 6b in a YZ projection. It is similar to the third exemplary embodiment, and only significant differences will be mentioned in the following text.

In this variant, partial bundles of rays TS1 are reflected only once at measuring standard 310. Bundle of rays S of a light source 321 is once again collimated via a collimating optics system 322 and split up into two partial bundles of rays TS1, TS2 by a splitting grating 324. Via gratings 325.1, 325.2, which once again act as deflection elements, partial bundles of rays TS1, TS2 are deflected inwardly, in the direction of optical axis Z, before they land on measuring standard 310, which once again is arranged as a rear surface grating. There, they are diffracted outwardly in the +1 or −1 order of diffraction, in a manner reflecting away from optical axis Z, and land on a combination grating 326 on the underside of scanning plate 323 at the location of optical axis Z. The three superposed bundles of rays emerging in resulting −1, 0, and +1 order of diffraction are once again converted into corresponding scanning signals by three associated detector elements, of which only a single detector element 329.1 is illustrated in FIG. 6b.

The special feature of this exemplary embodiment is that it requires only one deflection element per partial bundle of rays TS1, TS2 (in this instance, in the form of grating 325.1, 325.2), which corresponds to the minimally possible number of deflection elements. Together with the diffraction at splitting grating 324, at reflection grating 312 of measuring standard 310, and at combination grating 326, only four diffractions per partial bundle of rays TS1, TS2 are required. This increases the signal strength considerably. High signal strength is especially important when a cross grating is used as a measuring standard, which reflects only a small portion of the incident light output, into the desired order of diffraction.

Besides the exemplary embodiments discussed specifically, other arrangements are possible. Before this is briefly addressed in detail, it should be pointed out that it is possible to suitably combine measures and features from the different discussed exemplary embodiments.

Additionally, the optical path from the splitting grating to the combination grating may also be traversed in reverse order.

Also, instead of the splitting and combination grating, alternative optical components may be used, such as beam splitting cubes or partially transparent mirrors. Predominantly mirrors and prisms are possible as well as alternative deflection elements. It is especially advantageous to use blazed gratings as deflection elements, which have high diffraction efficiency in the desired order of diffraction.

It is also possible to use mirrors to deflect both partial bundles of rays in the same manner and to thereby fold the optical path. This may be advantageous for an especially small design.

Moreover, it is also possible to utilize other arrangements for generating phase-shifted scanning signals. Polarizing elements, for example, may be inserted into the optical path of the two bundles of rays, in order to polarize them orthogonally to each other, e.g., linearly or in a circular manner. When using polarization optical components such as polarizers, retardation plates and polarizing beam splitters, the two orthogonally polarized partial bundles of rays can be superimposed such that phase-shifted scanning signals result. In addition, the generation of a stripe pattern is possible, which shifts in response to a relative change in the phases of the partial bundles of rays and is converted into phase-shifted scanning signals by detectors structured in a stripe pattern.

Semiconductor lasers and LEDs are able to be used as light sources in the position measuring device. These light sources are basically usable also without downstream collimating optics. In this case, the main beam of the divergent or convergent bundle of rays must be utilized in order to be able to transfer the above conditions in the appropriate manner.

What is claimed is:
1. An optical position measuring device for detecting a relative position of a measuring standard and at least one scanning head, which are movable relative to each other in at least one measuring direction, wherein an effective measur- ing point of the scanning head lies at a defined distance from the measuring standard in a direction that is oriented away from the scanning head;

wherein a bundle of rays is split into two partial bundles of rays for optical scanning of the measuring standard, and each of the two partial bundles of rays impinges upon a reflection grating of the measuring standard at least once and is diffracted by the reflection grating such that a bisecting line between the partial bundle of rays incident on and reflected by the reflection grating intersects an optical axis in a point that is located on a side of the measuring standard facing away from the scanning head and represents the effective measuring point.

2. The optical position measuring device according to claim 1, wherein:

splitting of the bundle of rays into the two partial bundles of rays takes place at least prior to impingement of the reflection grating;

in a diffraction that takes place at the reflection grating, the partial bundles of rays are deflected away from the optical axis; and a deflection back to the optical axis takes place via at least one deflection element, where the partial bundles of rays are recombined.

3. The optical position measuring device according to claim 1, wherein the split-up partial bundles of rays extend in symmetry with respect to the optical axis between the splitting and the recombination.

4. The optical position measuring device according to claim 1, wherein the measuring standard is arranged as a rear surface grating and includes a plate-shaped transparent substrate and a reflection grating, having a reflective side oriented in a direction of the substrate and in a direction of the scanning head.

5. The optical position measuring device according to claim 1, wherein the measuring standard is arranged as a front surface grating and includes a reflection grating having a reflective side oriented in a direction of the scanning head.

6. The optical position measuring device according to claim 1, wherein:

the measuring standard is movable relative to a first scanning head along a first measuring direction; and the measuring standard is movable relative to a second scanning head along a second measuring direction, the second measuring direction having an orientation that is orthogonal to the first measuring direction.

7. The optical position measuring device according to claim 6, wherein the measuring standard is movable relative to a third scanning head along the first or second measuring direction.

8. The optical position measuring device according to claim 6, wherein the measuring standard is arranged as a cross grating.

9. The optical position measuring device according to claim 1, wherein the scanning head includes a light source, a plurality of detector elements, and a scanning plate having a splitting grating and a combination grating on one side and a plurality of additional gratings on an opposite side, so that:

a bundle of rays emitted by the light source is split up into two partial bundles of rays via the splitting grating;

the partial bundles of rays then propagate in a direction of a grating on the opposite side of the scanning plate and are thereby deflected in a direction of the optical axis, the partial bundles of rays then propagate further in a direction of the measuring standard, where a diffraction and back-reflection in the direction of the scanning head results;

the partial bundles of rays are each deflected via further gratings in the direction of the optical axis and propagate in a direction of the combination grating on the opposite side of the scanning plate, where the partial bundles of rays are interferentially superimposed;

superimposed partial bundles of rays propagate from the combination grating in a direction of the detector elements, via which phase-shifted scanning signals are detectable.

10. A system, comprising:

a measuring standard;

at least one scanning head, the measuring standard and scanning head being movable relative to each other in at least one measuring direction; and an optical position measuring device adapted to detect a relative position of the measuring standard and the scanning head;

wherein an effective measuring point of the scanning head lies at a defined distance from the measuring standard in a direction that is oriented away from the scanning head; and wherein a bundle of rays is split into two partial bundles of rays for optical scanning of the measuring standard, and each of the two partial bundles of rays impinges upon a reflection grating of the measuring standard at least once and is diffracted by the reflection grating such that a bisecting line between the partial bundle of rays incident on and reflected by the reflection grating intersects an optical axis in a point that is located on a side of the measuring standard facing away from the scanning head and represents the effective measuring point.

* * * * *